(12) United States Patent  
Huang

(10) Patent No.: US 9,257,854 B2
(45) Date of Patent: Feb. 9, 2016

(54) ELECTRONIC DEVICE AND PROTECTION CIRCUIT THEREOF

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Ren-Wen Huang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 153 days.

(21) Appl. No.: 14/093,025

(22) Filed: Nov. 28, 2013

(65) Prior Publication Data

US 2014/0347002 A1 Nov. 27, 2014

(30) Foreign Application Priority Data

May 22, 2013 (CN) .......................... 2013 1 1918571

(51) Int. Cl.
*H02J 7/00* (2006.01)
(52) U.S. Cl.
CPC .................................. *H02J 7/0031* (2013.01)

(58) Field of Classification Search
CPC ...... Y02E 60/12; H02J 7/0042; H02J 7/0045; H01M 10/46; H01M 10/44
USPC ............................................................. 320/107
See application file for complete search history.

(56) References Cited

U.S. PATENT DOCUMENTS

| | | | |
|---|---|---|---|
| 7,642,749 B2 * | 1/2010 | Nishida .......................... 320/119 |
| 2006/0208692 A1 * | 9/2006 | Kejha .............................. 320/103 |
| 2007/0229037 A1 * | 10/2007 | Hayashi ......................... 320/137 |
| 2009/0051315 A1 * | 2/2009 | Wang et al. .................... 320/113 |
| 2014/0002020 A1 * | 1/2014 | Geber et al. ................... 320/109 |

* cited by examiner

*Primary Examiner* — Arun Williams
(74) *Attorney, Agent, or Firm* — Novak Druce Connolly Bove + Quigg LLP

(57) ABSTRACT

An electronic device includes a charging socket, a protection circuit, and a battery. The charging socket includes a charging pin. The charging pin is detachably connected to a charging plug of a power supply device, receives power from the power supply device, and transmits the power to the battery. The protection circuit is connected between the battery and the charging socket, and controls whether the battery is electrically connected to the charging pin. During a process of disconnecting the charging socket from the charging plug, the protection circuit disconnects the battery from the charging pin before the charging pin is disconnected from the charging plug.

15 Claims, 1 Drawing Sheet

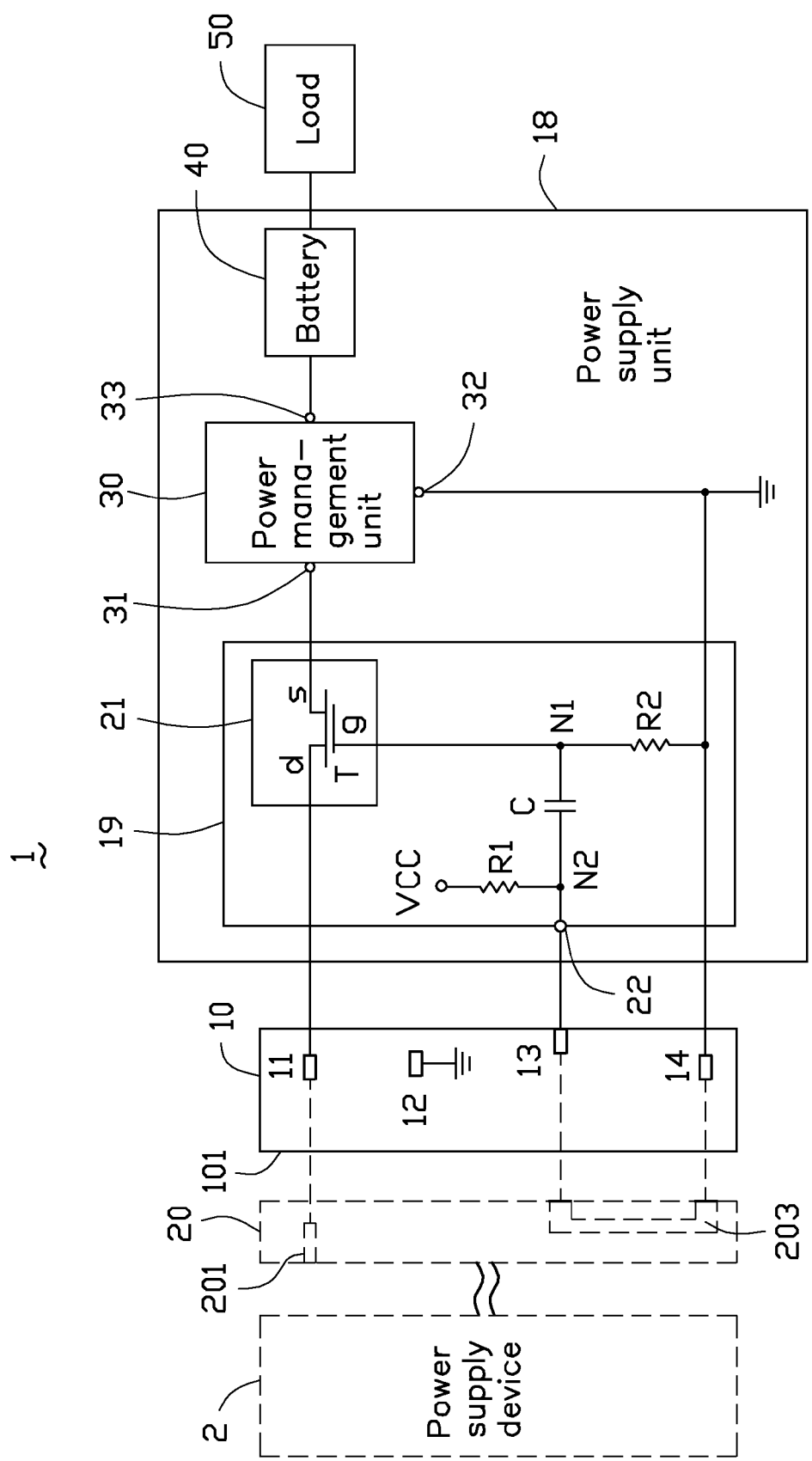

ELECTRONIC DEVICE AND PROTECTION CIRCUIT THEREOF

BACKGROUND

1. Technical Field

The present disclosure relates to an electronic device using the protection circuit.

2. Description of Related Art

Electronic devices, such as smart phones, typically have a charging socket to charge the device. The charging socket is connected to a charging plug of a charger, and power from a power source is transmitted to the electronic device via the charger. The charging socket includes a charging pin and a ground pin. The charging pin and the ground pin may be short-circuited when the charging plug is disconnected from the charging socket. Once the charging pin and the ground pin are short-circuited, a battery of the electronic device, the charging pin and the ground pin cooperatively form a closed circuit. As a result, the battery outputs a higher short circuit current to ground via the charging pin and the ground pin, instantaneously pulling down the power supplied to the electronic device from the battery. Accordingly, a working performance of the electronic device can become unstable.

Therefore, what is needed is an electronic device that can overcome the described limitations.

BRIEF DESCRIPTION OF THE DRAWINGS

The FIGURE is a circuit diagram illustrating one embodiment of an electronic device charged by a power supply device.

DETAILED DESCRIPTION

Reference will now be made to the drawings to describe embodiments of the present disclosure.

In the FIGURE, to express electrical connections between electronic components clearly, broken lines are used to designate plug connections between a charging socket 10 of an electronic device 1 and a charging plug 20 of a power supply device 2, and solid lines are used to designate electrical connections between electrical components of the electronic device 1.

The FIGURE is a circuit diagram illustrating the electronic device 1 being charged by the power supply device 2. The power supply device 2 includes the charging plug 20. The charging plug 20 includes an output pin 201 and a connection pin 203.

The electronic device 1 includes a charging socket 10, a load 50, and a power supply unit 18 connected between the charging socket 10 and the load 50. The charging socket 10 is detachably connected to the charging plug 20, and receives power from the power supply device 2. The power supply unit 18 receives the power from the power supply device 2 via the charging socket 10, stores the power, and outputs the power to the load 50. The charging socket 10 can be a universal serial bus (USB) interface or a Mini USB interface, and the charging plug 20 is a USB plug or a Mini USB interface.

The power supply unit 18 includes a protection circuit 19, a power management unit 30, and a battery 40. The protection circuit 19 is connected to the charging socket 10. The power management unit 30 is connected between the protection circuit 19 and the battery 40.

The protection circuit 19 controls whether the battery 40 is electrically connected to the charging socket 10 via the power management unit 30, based on a connection state between the charging socket 10 and the charging plug 20. The power management unit 30 receives the power from the power supply device 2 via the protection circuit, and outputs the received power to the battery 40. The battery 40 receives the power from the power management unit 30, stores the power, and outputs the power to the load 50. The load 50 operates based on the power.

The charging socket 10 includes an opening 101, a charging pin 11, a ground pin 12, a detection pin 13, and a power pin 14. The charging pin 11, the ground pin 12, the detection pin 13, and the power pin 14 are exposed from the opening 101. The ground pin 12 is connected to ground. In the embodiment, the charging pin 11 can be arranged closer to the opening 101 than the detection pin 13.

The protection circuit 19 includes a controller 21, a sensing end 22, a power input VCC, a first resistor R1, a second resistor R2, and a capacitor C. The controller 21 includes a switch T. The switch T includes a control end g, a first conductive end d, and a second conductive end s. The switch T can be a transistor. The transistor can be a positive channel metal oxide semiconductor (PMOS). Correspondingly, the control end g is a gate electrode of the transistor, the first conductive end d is a drain electrode of the transistor, and the second conductive end s is a source electrode of the transistor.

The first conductive end d is connected to the charging pin 11. The second conductive end s is connected to the power management unit 30. The control end g is connected to ground via the second resistor R2. The control end g and the second resistor R2 cooperatively define a first node N1 therebetween. The sensing end 22 is connected to the detection pin 13, and is further connected to the first node N1 via the capacitor C. The sensing end 22 and the capacitor C cooperatively define a second node N2 therebetween. The power input VCC is connected to the second node N2 via the first resistor R1. The power input VCC receives a first voltage. The first voltage can be about 5 volts (V) from the battery 40.

The power management unit 30 includes an input 31, a ground end 32, and an output 33. The input 31 is connected to the second conductive end s. The ground end 32 is connected to ground. The output 33 is connected to the battery 40.

When the power supply device 2 charges the electronic device 1, the detection pin 13 and the power pin 14 are connected to the connection pin 203. Accordingly, the detection pin 13 is connected to ground via the connection pin 203 and the power pin 14. That is, a second voltage applied to the sensing end 22 equals about 0 V. The switch T is switched on based on the second voltage applied on the sensing end 22. Correspondingly, the controller 21 controls the battery 40 electrically connecting to the power supply device 2 via the power management unit 30. The power supply device 2 supplies the power to the battery 40 via the output pin 201, the charging pin 11, the switch T switched on, and the power management unit 30. Accordingly, the electronic device 1 is charging by the power supply device 2.

During a process of disconnecting the charging plug 20 from the charging socket 10, the detection pin 13 is disconnected from the power pin 14 before the charging pin 11 is disconnected from the charging plug 20. The second voltage applied to the sensing end 22 is suddenly changed from about 0 V to the first voltage applied to the power input VCC. Accordingly, the first voltage is applied to the control end g via the capacitor C. The switch T is switched off. The battery 40 cannot output a current to the charging socket 10 via the power management unit 30 and the controller 21, even though the charging pin 11 and the ground pin 12 are short-circuited.

Because the protection circuit 19 ensures the battery 40 does not output the current to the charging socket 10 based on the second voltage applied to the sensing end 22, and although the charging pin 11 and the ground pin 12 are short-circuited during the process of disconnecting the charging plug 20 from the charging socket 10, the working performance of the electronic device 1 is stable.

It is believed that the present embodiments and their advantages will be understood from the foregoing description, and it will be apparent that various changes may be made thereto without departing from the spirit and scope of the present disclosure or sacrificing all of its material advantages.

What is claimed is:

1. An electronic device, comprising a battery, a charging socket, and a protection circuit connected between the battery and the charging socket, wherein the charging socket is detachably connected to a charging plug of a power supply device and transmitting power from the power supply device to the battery; the charging socket comprises a charging pin receiving the power and transmitting the power to the battery, and a ground pin connected to ground, the protection circuit is connected between the battery and the charging socket, and controlling whether the battery is electrically connected to the charging pin; when the charging socket is disconnected from the charging plug, the protection circuit disconnects the battery from the charging pin before the charging pin is disconnected from the charging plug;

wherein the charging socket further comprises a detection pin detachably connected to the charging plug; when the detection pin is electrically connected to the charging plug, a first voltage from a first power source is applied to the detection pin; when the detection pin is disconnected from the charging plug, a second voltage from a second power source is applied to the detection pin; the first voltage differs from the second voltage; when the charging socket is disconnected from the charging plug, the detection pin is disconnected from the charging plug before the charging pin is disconnected from the charging plug; the protection circuit controls whether the battery is connected to the charging pin based on which of the first and second voltages is applied to the detection pin.

2. The electronic device of claim 1, wherein the protection circuit controls the battery to connect to the charging pin when the first voltage is applied to the detection pin, and controls the battery disconnect from the charging pin when the second voltage is applied to the detection pin.

3. The electronic device of claim 2, wherein the charging socket further comprises a power pin connected to the first power source; when the detection pin is connected to the power pin via the charging plug, the first voltage is applied to the charging pin via the power pin and the charging plug.

4. The electronic device of claim 3, wherein the protection circuit comprises a control circuit, the control circuit control comprises a switch, the switch varies from on to off if the detection pin is disconnected from the charging plug before the charging pin is disconnected from the charging plug when the charging socket is disconnected from the charging plug.

5. The electronic device of claim 4, wherein the switch comprises a control end, a first conductive end, and a second conductive end; the first conductive end is connected to the charging pin; the second conductive end is connected to the battery; the control end is connected to the detection pin, and controls whether the first conductive end is connected to the second conductive end based on which of the first and second voltages is applied on the detection pin.

6. The electronic device of claim 5, wherein the protection circuit further comprises a power input, a first resistor, a second resistor, and a capacitor; the control end is further connected to ground via the second resistor; the control end and the second resistor cooperatively define a first node therebetween; the capacitor is connected between the first node and the detection pin; the detection pin and the capacitor cooperatively define a second node therebetween; the power input is connected to the second node; the power input receives the second voltage from the second power source.

7. The electronic device of claim 6, further comprising a power management unit connected between the control circuit and the battery; the power management unit receives the power from the power supply device via the control circuit, and outputs the power to the battery.

8. The electronic device of claim 1, wherein the first voltage is about 0 V, and the second power source is the battery.

9. The electronic device of claim 4, wherein the charging socket further comprises an opening exposing the charging pin, the ground pin, the detection pin, and the power pin; the charging pin is arranged closer to the opening than the detection pin.

10. The electronic device of claim 5, wherein the switch is a transistor.

11. A protection circuit connected between a battery and a charging socket, the charging socket is detachably connected to a charging plug of a power supply device and transmitting power from the power supply device to the battery, the protection circuit comprising a control circuit, the control circuit comprises a switch, and when the charging socket is disconnected from the charging plug, the switch varies from on to off if a detection pin of the charging socket is disconnected from the charging plug before a charging pin of the charging socket is disconnected from the charging plug;

wherein when the detection pin is electrically connected to the charging plug, a first voltage from a first power source is applied to the detection pin; when the detection pin is disconnected from the charging plug, a second voltage from a second power source is applied to the detection pin; the first voltage differs from the second voltage; the protection circuit controls whether the battery is connected to the charging pin based on which of the first and second voltages is applied to the detection pin.

12. The protection circuit of claim 11, wherein the protection circuit controls the battery to connect to the charging pin when the first voltage is applied to the detection pin, and controls the battery disconnect from the charging pin when the second voltage is applied to the detection pin.

13. The protection circuit of claim 12, wherein the switch comprises a control end, a first conductive end, and a second conductive end; the first conductive end is connected to the charging pin; the second conductive end is connected to the battery; the control end is connected to the detection pin, and controls whether the first conductive end is connected to the second conductive end based on which of the first and second voltages is applied on the detection pin.

14. The protection circuit of claim 13, wherein the protection circuit further comprises a power input, a first resistor, a second resistor, and a capacitor; the control end is further connected to ground via the second resistor; the control end and the second resistor cooperatively define a first node therebetween; the capacitor is connected between the first node and the detection pin; the detection pin and the capacitor cooperatively define a second node therebetween; the power input is connected to the second node; the power input receives the second voltage from the second power source.

15. The protection circuit of claim 13, wherein the switch is a transistor.

\* \* \* \* \*